United States Patent [19]

Goto

[11] Patent Number: 5,606,739
[45] Date of Patent: Feb. 25, 1997

[54] RADIO COMMUNICATION APPARATUS HAVING A BATTERY SAVING FUNCTION

[75] Inventor: Hiroyuki Goto, Tokyo, Japan

[73] Assignee: Kabushiki Kaisha Toshiba, Kanagawa-ken, Japan

[21] Appl. No.: 870,662

[22] Filed: Apr. 17, 1992

[30] Foreign Application Priority Data

Apr. 19, 1991 [JP] Japan .................... 3-113803

[51] Int. Cl.⁶ ..................................... H04B 1/16
[52] U.S. Cl. ................ 455/343; 455/38.3; 340/825.44
[58] Field of Search .................... 455/38.3, 38.4, 455/127, 343, 260, 265; 340/825.44, 311.1

[56] References Cited

U.S. PATENT DOCUMENTS

| | | | |
|---|---|---|---|
| 4,340,973 | 7/1982 | Umetsu | 455/343 |
| 4,422,178 | 12/1983 | Mori | 455/343 |
| 4,631,496 | 12/1986 | Borras et al. | 455/343 |
| 5,140,698 | 8/1992 | Toko | 455/343 |
| 5,152,006 | 9/1992 | Klaus | 455/343 |
| 5,274,369 | 12/1993 | Tsunoda et al. | 455/38.3 |

FOREIGN PATENT DOCUMENTS 42924  2/1991  Japan ................... 455/38.3

*Primary Examiner*—Edward F. Urban
*Assistant Examiner*—Thanh Le
*Attorney, Agent, or Firm*—Banner & Allegretti, Ltd.

[57] ABSTRACT

A radio communication apparatus intermittently powered in synchronism with an intermittent reception control signal transmitted from a base station is disclosed. The apparatus includes a synthesizer, wherein power supplied to the synthesizer is initiated prior to the power supply to circuits other than the synthesizer.

46 Claims, 10 Drawing Sheets

RADIO COMMUNICATION APPARATUS HAVING A BATTERY SAVING FUNCTION

BACKGROUND OF THE INVENTION

1. Field of the Invention

The present invention relates to the field of radio communication apparatus such as mobile telephones, portable telephones, cordless telephones, pagers, and the like. More specifically, the present invention relates to a radio communication apparatus intermittently powered by a battery.

2. Description of the Related Art

In general, radio communication devices used in radio systems are battery powered. Because batteries have a limited power capacity, it is necessary to reduce the power consumed by the radio communication devices in order to preserve their batteries.

For example, the power consumed by pagers in a conventional paging system is reduced in order to prevent battery wear in the following manner. The pagers are divided into several groups. The supply of power from a battery to a radio receiver section of a pager is periodically turned off. The power supply is turned on only to receive paging signals directed to the group to which the pager belongs.

FIG. 1 shows a known signal format used in a paging system with a conventional battery saving function. Referring to FIG. 1(a), all pagers in the system are divided into n groups, for example, 15 groups. A base station repeatedly broadcasts a frame signal consisting of n group signals. Each group signal includes preamble words and m paging words (FIG. 1(b)) where m is 20. The preamble word includes a predetermined signal sequence for synchronization of received signals and a group designation signal (an intermittent reception control signal) for designating the group of pagers to which the associated paging words are addressed. Each paging word includes data bits and check bits (FIG. 1(c)). The data bits consist of x bits and the check bits consist of y bits. The data bits represent an identification number of paged (called) pagers. The check bits correct any error occurring in the data bits. The paging word consisting of data bits and check bits may be a so-called (31, 16) BCH code in which 15 check bits are appended to 16 data bits.

A base station receives a paging request to a pager from a landline telephone via a paging exchange. In response thereto, the base station inserts an identification number corresponding to the paged pager into the data bits of one of the paging words when broadcasting the paging words of the group to which the pager belongs. If a pager belongs to group 2, the pager automatically turns on the power supply to its radio receiver section only when paging words for group 2 are broadcast. Paging words are broadcast periodically at a predetermined time interval (once per frame). Once the pager synchronizes to the timing schedule at which the paging words of group 2 are broadcast, the power supply to the radio section is thereafter automatically and repeatedly turned on and off. This results in a cyclic, intermittent power supply to the pager.

A problem with the conventional battery saving technique employed in a radio communication apparatus is that all of the circuits in the apparatus are simultaneously supplied with power in synchronism with the control signal transmitted from the base station. In general, a radio communication apparatus has a variety of circuits. The time period required for a circuit to be rendered operative varies depending on the characteristics of the circuit. For example, a synthesizer circuit needs more time to output a stabilized synchronization signal than other circuits. Circuit characteristics are not considered in the conventional battery saving technique.

SUMMARY OF THE INVENTION

It is accordingly an object of the present invention to provide a radio communication apparatus which may operate with reduced power consumption.

It is a further object of the present invention to provide a radio communication apparatus in which the power supply to a radio receiver section thereof is efficiently turned on.

To achieve the above objects, as embodied and described herein, a radio communication apparatus is provided having first and second circuits intermittently powered in synchronism with an intermittent reception control signal transmitted from a base station. The time required for the first circuit to be rendered operative after power is supplied thereto is longer than the time required for the second circuit to be rendered operative after power is supplied to the second circuit. The apparatus further includes a battery for generating electric power, a power supplying circuit for supplying the apparatus with electric power, and a controller for controlling the power supplying circuit so that the power supply to the first circuit is initiated prior to the power supply to the second circuit.

The apparatus may further include a receiving section for receiving radio frequency signals transmitted over a radio link, for demodulating the received radio frequency signals into baseband signals, and for outputting the baseband signals. The first circuit may additionally include at least a portion of a synthesizer for generating a particular frequency to be supplied to the receiving section. The power supplying circuit may further include a switch, responsive to control signals from the controller, for connecting and disconnecting the power supply from the battery to the second circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

Preferred embodiments of the present invention will be described with reference to the accompanying drawings.

Figure 2:
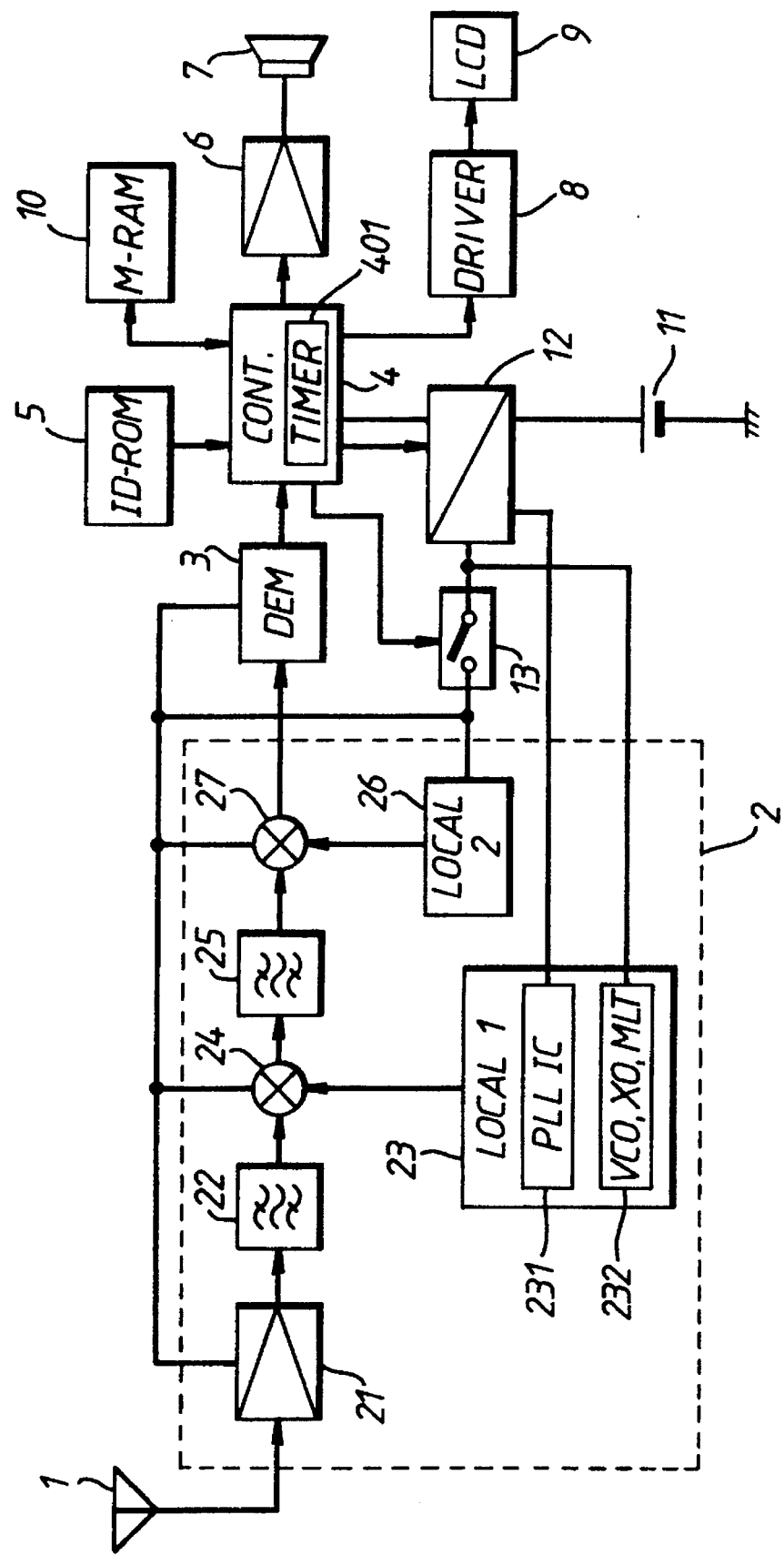
FIG. 2 is a block diagram showing a pager according to a first embodiment of the present invention.

A double superheterodyne-type pager will be described with reference to FIG. 2. FIG. 2 is a block diagram showing the pager according to a first embodiment of the present invention. The pager operates in a paging system wherein paging words are broadcast periodically at a predetermined time interval as mentioned above. The pager as shown in FIG. 2 comprises an antenna 1 and radio circuitry 2 coupled to the antenna 1. The radio circuitry 2 is all so coupled to a demodulator 3. The demodulator 3 comprises an IFIC (Intermediate Frequency Integrated Circuit). A controller 4 having an internal timer 401 is coupled to the demodulator 3, a read only memory (hereinafter referred to as ID-ROM) 5, a message random access memory (hereinafter referred to as M-RAM) 10, an amplifier 6, and a liquid crystal display (hereinafter referred to as LCD) driver 8. The ID-ROM 5 stores the identification code assigned to the apparatus. The M-RAM 10 stores messages sent to the apparatus via a radio link. The amplifier 6 is coupled to a speaker 7. The LCD driver 8 drives an LCD 9. A power source circuit 12 converts a voltage from a battery 11 to desired voltages by regulating the desired voltages and supplies the regulated desired voltages to the circuitry.

The radio circuitry 2 comprises a radio frequency amplifier 21 coupled to the antenna 1. The amplifier is also coupled to a first bandpass filter 22 whose output signals are applied to a first mixer 24. The first mixer 24 mixes the signals output from the first bandpass filter 22 with signals output from a first local oscillator 23. A second bandpass filter 25 is provided between the first mixer 24 and a second mixer 27. The second mixer 27 mixes the signals output from the second bandpass filter 25 with signals output from a second local oscillator 26. The second local oscillator 26 comprises a crystal oscillator. The second mixer 26 is coupled to the demodulator 3.

The first local oscillator 23 comprises a synthesizer. That is to say, the first local oscillator 23 comprises a phase locked loop integrated circuit (hereinafter referred to as PLL-IC) 231 and a 1.0 V circuit 232. The term "1.0 V circuit" refers to a circuit which requires approximately 1.0 V for its operation. The 1.0 V circuit 232 comprises a voltage controlled oscillator (hereinafter referred to as VCO), a crystal oscillator (hereinafter referred to as XO), and a multiplier.

A switch 13 is provided in a power supply path between the power source circuit 12 and other circuitry such as the second local oscillator 26, the radio frequency amplifier 21, the first mixer 24, the second mixer 27, and the demodulator 3. Switch 13 switches over in response to the logic levels of a switching control signal output from the controller 4. The logic levels of the switching control signal are changed at certain intervals. When switch 13 is closed, the voltage from the power source circuit 12 is applied to the radio frequency amplifier 21, the first mixer 24, the second mixer 27, the second local oscillator 26, and the demodulator 3. The controller 4 controls the power source circuit 12 so that the regulated desired voltages are supplied to the PLL-IC 231, the 1.0 V circuit 232, and the switch 13 at a certain intervals.

According to a feature of the present invention applied to the above-mentioned intermittent reception operation, the controller 4 provides a first control signal to the power source circuit 12 so as to supply a voltage, for example 1.4 V, to the PLL-IC 231. After a predetermined time period, for example, after 3 msec has passed from the time when the power supply to the PLL-IC 231 is initiated, the controller 4 provides a second control signal to the power source circuit 12 so as to supply a voltage of approximately 1.0 V to the 1.0 V circuitry 232. Further, when a predetermined time period, for example, 30 msec has passed from the time when the approximately 1.0 V signal was supplied to the 1.0 V circuitry 232, the switch 13 is closed under control of the controller 4. Responsive to the closure of the switch 13, a voltage, for example 1.0 V, is supplied to circuitry such as the second oscillator 26, the radio frequency amplifier 21, the first mixer 24, the second mixer 27 and the demodulator 3. The PLL-IC 231 requires, for example, 2.5 msec to be rendered operative from the time when the power supply to the PLL-IC 231 is initiated. The PLL-IC 231 also requires, for example, 2.5 msec to receive channel data output from the controller 4. The 1.0 V circuitry 232 requires, for example, 2 msec to be rendered operative from the time when the power supply to the 1.0 V circuitry 232 is initiated. The synthesizer of the first local oscillator 23 requires, for example, 28 msec to be locked. According to the above three steps of supplying power, it is possible to reduce power consumed by the apparatus compared with the conventional apparatus.

The operation of the pager will be described below. The operations are executed during a period when power is supplied to the radio circuitry 2 and the demodulator 3.

When the radio circuitry 2 receives paging signals having a radio frequency f via the antenna 1, the radio frequency amplifier 21 amplifies the received signals. The first bandpass filter 22 filters the amplified signals and outputs filtered signals to the mixer 24. In addition, oscillation signals from the first local oscillator 23 having a frequency f- IF1 are applied to the mixer 24. The frequency f is, for example, 280 MHz. The frequency IF1 is a first intermediate frequency, for example, 21.7 MHz. The mixer 24 mixes the filtered signals and the oscillation signals, and outputs the first intermediate frequency signals to the second bandpass filter 25. The second bandpass filter 25 filters the first intermediate frequency signals supplied from mixer 24 and the resulting filtered signals are applied to the mixer 27. The second local oscillator 26 provides oscillation signals of a frequency IF1–IF2 and outputs the oscillation signals to the mixer 27. The frequency IF2 is a second intermediate frequency, for example, 455 KHz. The mixer 27 mixes the filtered signals and the oscillation signals and outputs the second intermediate frequency signals to the demodulator 3. The demodulator 3 demodulates the second intermediate frequency signals and produces baseband signals.

The controller 4 obtains the identification code stored in the ID-ROM 5 and compares the identification code stored in the ID-ROM 5 to an identification code included in the baseband signals output from the demodulator 3. Paging alert tones are output from the speaker 7 via the amplifier 6 only when the identification codes match. When the received signals include a message, the message is displayed at the LCD 9 via the driver 8 and is stored in the M-RAM 10.

Figures 1A, 1B, 1C:
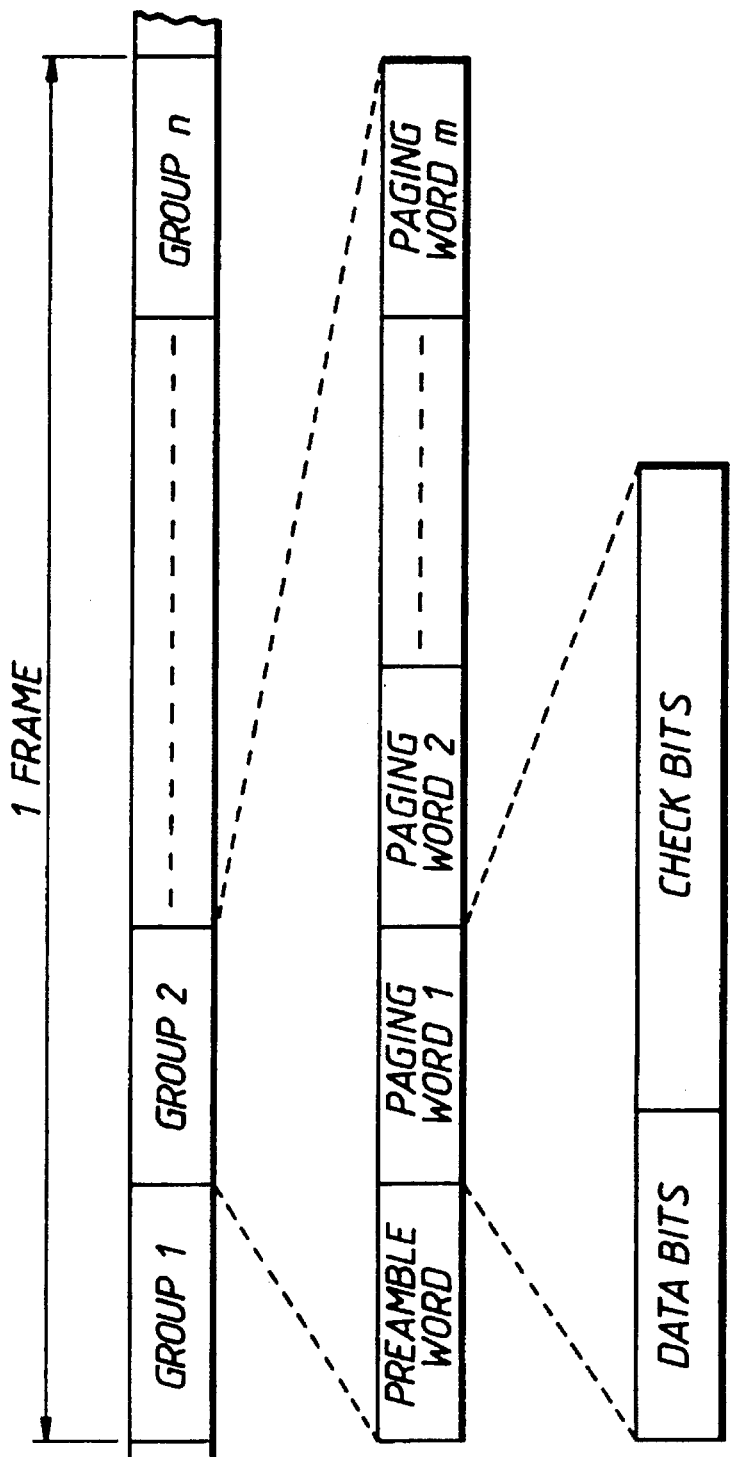
FIG. 1 is a diagram showing data formats used in a conventional paging system.
Figure 3:
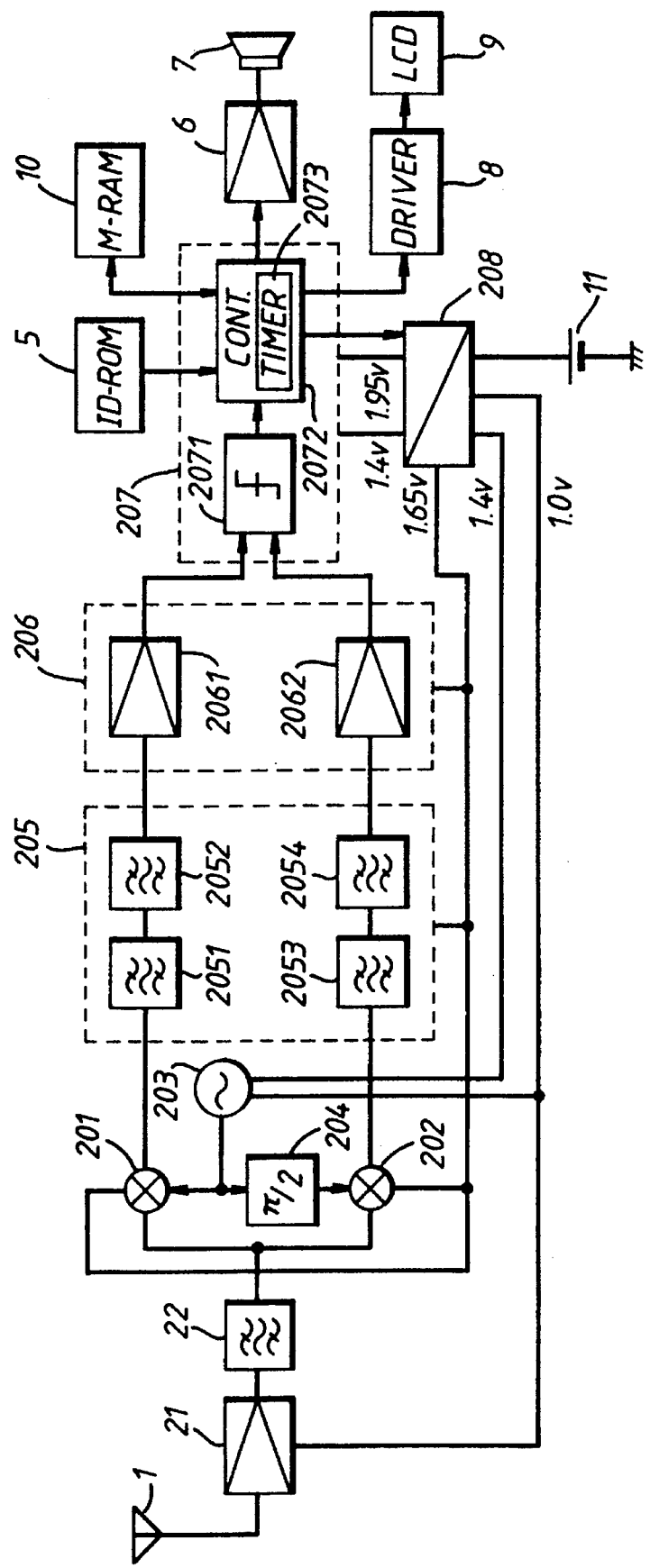
FIG. 3 is a block diagram showing a pager according to a second embodiment of the present invention.

Next, a direct conversion-type pager will be described with reference to FIG. 3. FIG. 3 is a block diagram showing the pager according to a second embodiment of the present invention. In the second embodiment, the present invention is applied to a pager employing a digital signal modulation method, such as a FSK (frequency shift keying) method. As shown in FIG. 3, the pager comprises a FSK signal receiver. The components common to FIG. 1 are given the same reference numbers. Such common components in FIG. 3 generally operate in a manner similar to that of the corresponding components in FIG. 1.

Each of mixers 201,202 coupled to the first bandpass filter 22 preferably comprises a bipolar transistor. A local oscillator 203 coupled to the mixers 201,202, preferably comprises a synthesizer. A phase shifter 204, provided between the mixer 202 and the local oscillator 203, subjects the oscillation signals output from the local oscillator 203 to a π/2 phase shift. A filter IC 205, preferably comprising a bipolar transistor, is coupled to the outputs of the mixers 201, 202. The filter IC 205 is coupled to a limiter IC 206. The limiter IC 206 comprises a bipolar transistor. Output signals of the limiter IC 206 are applied to a control circuitry 207. The control circuitry 207 may comprise a chip, preferably a chip of CMOS (Complementary Metal Oxide Semiconductor).

The filter IC 205 comprises bandpass filters 2051, 2052 coupled to the mixer 201 and bandpass filters 2053, 2054 coupled to the mixer 202. The limiter IC 206 comprises an amplifier 2061 coupled to the bandpass filter 2052 and an amplifier 2062 coupled to the bandpass filter 2054. The amplifiers 2061, 2062 operate as amplitude limiters. The control circuitry 207 comprises a detector 2071 coupled to the amplifiers 2061, 2062 and a controller 2072 which includes a timer 2073.

The radio frequency amplifier 21 and a portion of the local oscillator 203 are preferably supplied with 1.0 V obtained from a power source circuit 208. The other portion of the local oscillator 203 and the controller 2072 are preferably supplied with 1.4 V obtained from the power source circuit 208. The controller 2072 is also preferably supplied with 1.95 V obtained from the power source circuit 208. The mixers 201,202, the filter IC 205 and the limiter IC 206 are preferably supplied with 1.65 V obtained from the power source circuit 208. The detector 2071 is preferably supplied with 1.95 V via the controller 2072.

The above voltages are supplied to the various circuits in the following manner. The detector 2071 and the controller 2072 are constantly supplied with the power. The power supply for the local oscillator 203 is preferably initiated a predetermined time before the pager operates to receive paging signals during the cyclic battery saving operation. The predetermined time may be a time period necessary for the local oscillator 203 to be rendered operative when power is supplied thereto. Power may be supplied to the radio frequency amplifier 21 at the same time as the local oscillator 203. The power supply for the mixers 201,202, the filter IC 205, and the limiter IC 206 is preferably initiated a predetermined time before the pager receives paging signals during the cyclic battery saving operation. The predetermined time may be the time period required for the limiter IC 206 to be rendered operative when power is supplied thereto. This is because the time period required for the limiter IC 206 to be rendered operative is the longest among these circuits. Accordingly, if another circuit requires a longer time period to be rendered operative, that time period may be utilized as the predetermined time.

Generally, the time period required for the limiter IC 206 to be rendered operative may be shorter than that required for the local oscillator 203. Additionally, the value of the current required in the receiver of the direct conversion-type pager, 2.8 mA for example, is greater than that required in the receiver of the double superheterodyne-type pager, which may be 1.7 mA for example. Therefore, it may be preferable to apply the present invention to the direct conversion-type pager.

The operation of the pager shown in FIG. 3 will now be described. The following operations are conducted when the circuitry is rendered operative.

When FSK signals are input to the apparatus via the antenna 1, the radio frequency amplifier 21 amplifies the FSK signals and the amplified signals are applied to the first bandpass filter 22. The first bandpass filter 22 filters the amplified signals and outputs filtered signals to the mixers 201,202. The local oscillator 203 generates local oscillating signals. The frequency of the local oscillating signals is substantially equal to a frequency of carrier signals for the FSK signals. The local oscillating signals are applied to the mixer 201. In addition, the oscillating signals are subjected to a π/2 phase shift by the phase shifter 204 and applied to the mixer 202. The mixer 201 mixes the filtered signals and the local oscillating signals so as to produce baseband signals. The mixer 202 mixes the filtered signals and the π/2 phase shifted local oscillating signals so as to produce baseband signals. The baseband signals output from the mixer 201 are applied to the bandpass filters 2051, 2052. The bandpass filters 2051, 2052 filter the baseband signals applied thereto. The amplifier 2061 amplifies the filtered signals so as to limit the amplitude of the filtered signals. The baseband signals output from the mixer 202 are applied to the bandpass filters 2053, 2054. The bandpass filters 2053, 2054 filter the baseband signals applied thereto. The amplifier 2062 amplifies the filtered signals so as to limit the amplitude of the filtered signals. The amplified signals output from the amplifiers 2061, 2062 are applied to the detector 2071. The detector 2071 detects the amplified signals in order to demodulate the amplified signals. After the demodulated signals from the detector 2071 are applied to the controller 2072, the rest of the operation is the same as described in FIG. 1.

Figure 4:
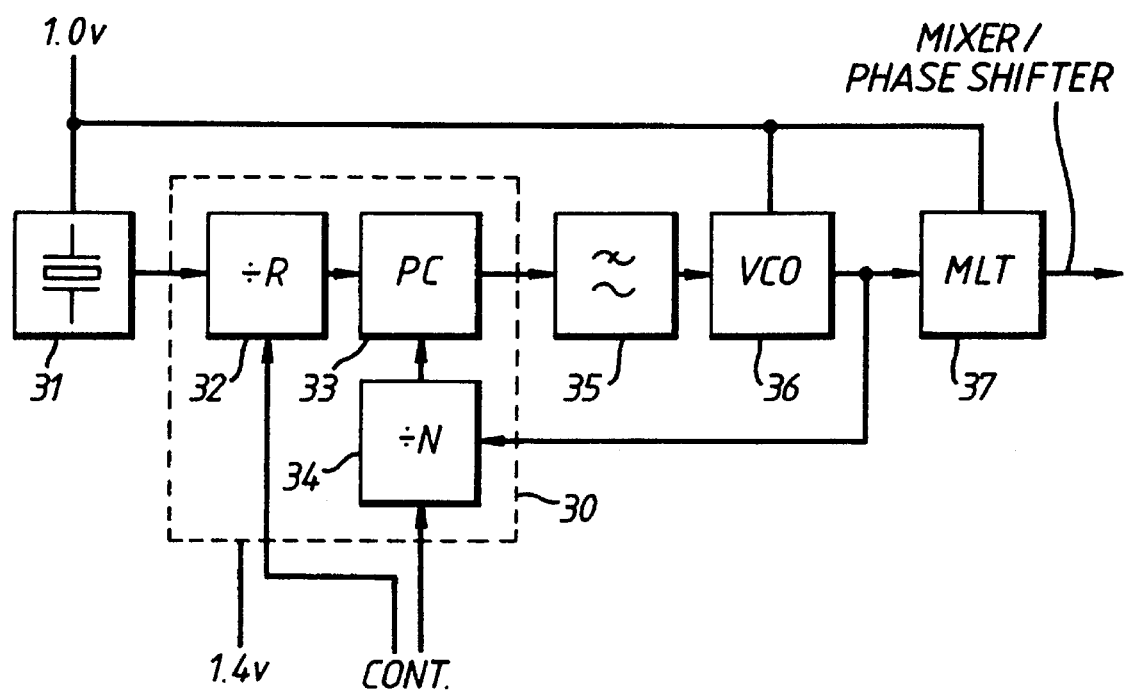
FIG. 4 is a block diagram showing a local oscillator employed in the apparatus shown in FIG. 3.

FIG. 4 is a block diagram of the local oscillator 203 shown in FIG. 3. The voltages specified below are intended to illustrate a preferred embodiment and should not be considered limiting. The local oscillator shown in FIG. 4 comprises a reference oscillator 31 which is an XO, a PLL-IC 30 coupled to the reference oscillator 31, a lowpass filter 35 coupled to the PL-LIC 30, a VCO 36 coupled to the lowpass filter 35 and the PLL-IC 30, and a multiplier 37 coupled to the VCO 36, the mixer 201 and the phase shifter 204. The PLL-IC 30 comprises a reference divider 32 which divides the frequency of oscillation signals from the reference oscillator 31. A phase comparator 33 is coupled to the reference divider 32 and the lowpass filter 35. A comparison divider 34 divides the frequency of the oscillation signals from the VCO 36. The output of the comparison divider 34 is coupled to the phase comparator 33. A 1.0 V potential is supplied to the reference oscillator 31, the VCO 36 and the multiplier 37. A 1.4 V potential is supplied to the PLL-IC 30.

When the PLL-IC 30 is rendered operative, the controller 2072 outputs channel data signals to determine the dividing rates of the reference divider 32 and the comparison divider 34, respectively. The oscillation frequency of the reference oscillator 31 output is divided in the reference divider 32 on the basis of the dividing rate supplied thereto. The oscillation frequency of the VCO 36 output is divided in the comparison divider 34 on the basis of the dividing rate supplied thereto. The phase comparator 33 detects and compares the output signals of the reference divider 32 and the comparison divider 34. When the output signals are not substantially equal, the phase comparator 33 outputs information signals. The information signals are filtered in the lowpass filter 35 and the filtered information signals are applied to the VCO 36. The VCO 36 controls its oscillating frequency on the basis of the filtered information signals. The multiplier 37 multiplies the output signals of the VCO 36 and the resulting multiplied signals are applied to the mixer 201 and the phase shifter 204. The above operations may be repeated until the output signals from the reference divider 32 and the comparison divider 34 become substantially equal. When the output signals become substantially equal, the VCO 36 is locked so that the operation of the local oscillator 203 is stabilized. Because of the relatively long time period required to achieve the locked state, the local oscillator 203 requires more time to be rendered operative when power is supplied thereto than the circuitry supplied with 1.65 V.

It may be desirable to provide a switch on the power supply path between the VCO 36 and the multiplier 37. Because it is not necessary to operate the multiplier 37 before the locked state has been achieved, the switch may be closed to connect the VCO 36 and the multiplier 37 at the same time that 1.65 V is supplied to the circuitry in FIG. 3. By providing the switch, the power consumption can be further reduced.

Figure 5:
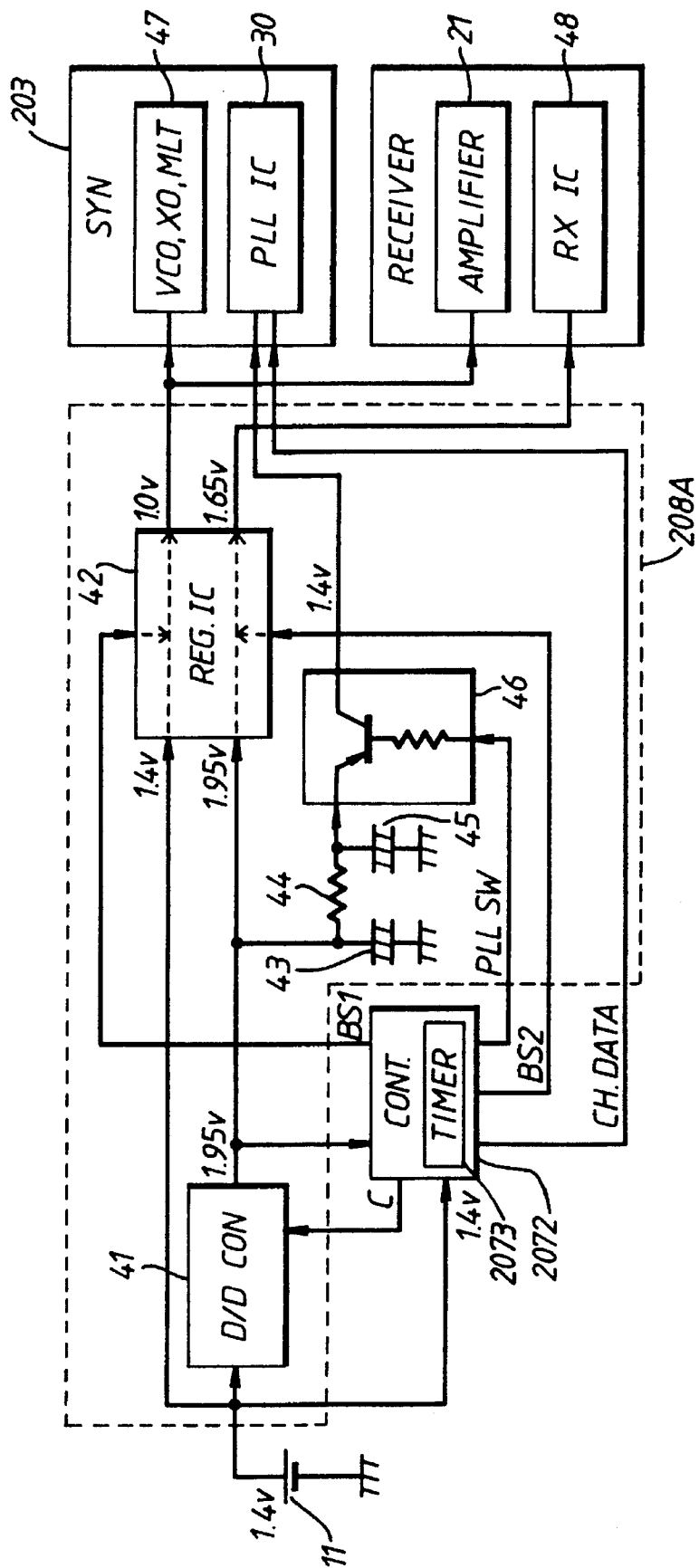
FIG. 5 is a block diagram showing a first alternative of power source circuit employed in the pager shown in FIG. 3.

FIG. 5 is a block diagram showing a power source circuit 208A according to a first embodiment of the power source circuit 208 shown in FIG. 3. As above, the specified voltages are intended to be illustrative. A DC/DC converter 41, in response to clock signals supplied from the controller 2072, converts a 1.4 V signal obtained from the battery 11 into a 1.95 V signal. A regulator IC 42 converts and regulates the 1.4 V signal obtained from the battery 11 into a 1.0 V signal. The regulator IC 42 also converts and regulates the 1.95 V signal obtained from the DC/DC converter 41 into a 1.65 V signal. The 1.95 V signal output from the DC/DC converter 41 is reduced to 1.4 V by capacitors 43, 45, resistor 44 and a switching transistor 46. As described above, a 1.0 V circuit refers to a circuit which requires approximately 1.0 V for its operation. A 1.0 V circuit 47 in the local oscillator 203 comprises the VCO 36, the reference oscillator 31, and the multiplier 37. An RX-IC 48 comprises the mixers 201, 202, the filter IC 205, and the limiter IC 206.

Figure 6:
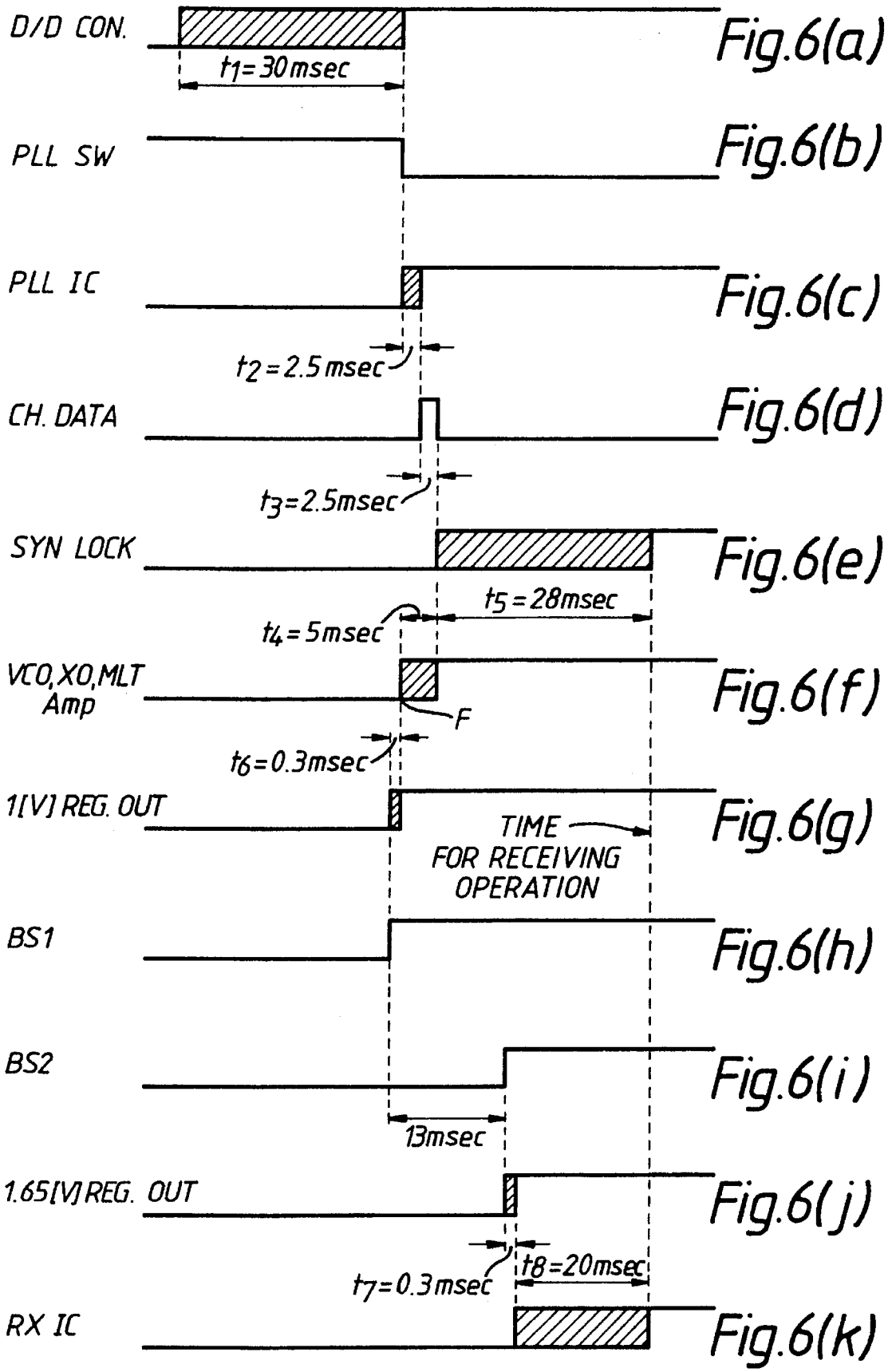
FIG. 6 is a timing chart for explaining the operations of the pager shown in FIG. 3.

The operation of the power source circuit 208A shown in FIG. 5 will be described with reference to FIG. 6. FIG. 6 is a time chart for illustrating the timing of control signals supplied from the controller 2072 and the operation timing of the power source circuit 208.

The controller 2072 is constantly supplied with a 1.4 V signal obtained from the battery 11. When the controller 2072 supplies clock signals to the DC/DC converter 41, the DC/DC converter 41 is rendered operative in a predetermined time t1, for example, 30 msec as illustrated in FIG. 6(a). The DC/DC converter 41 supplies a 1.95 V signal to the controller 2072 and the regulator IC 42. The control signal PLL-SW supplied to the switching transistor 46 is changed by the controller 2072 from a high level to a low level at substantially the same time that the DC/DC converter 41 is rendered operative (FIG. 6(b)). Responsive to the level change of control signal PLL-SW, an emitter-collector is closed so that the 1.95 V signal is reduced to 1.4 V by operation of the capacitors 43, 45, the resistor 44 and the switching transistor 46. As a result, a 1.4 V signal is supplied to the PLL-IC 30. The PLL-IC 30 requires a predetermined time t2, for example 2.5 msec as illustrated in FIG. 6(c), to be rendered operative. When the PLL-IC 30 is rendered operative, the controller 2072 supplies channel data to the PLL-IC 30. As described in FIG. 5, the channel data determine the dividing rates of the dividers in the PLL-IC 30. It takes a predetermined time t3, for example 2.5 msec as illustrated in FIG. 6(d), for the channel data to be received by the PLL-IC 30.

The local oscillator 203 includes 1.0 V circuit 47. The controller 2072 supplies control signal BS1 to the regulator IC 42 at a predetermined time, for example 0.3 msec, before the control signal PLL-SW is supplied (FIG. 6(h)). Responsive to the control signal BS1, the regulator IC 42 starts to convert the 1.4 V signal into a 1.0 V signal and outputs the regulated 1.0 V signal to the 1.0 V circuit 47 in a predetermined time t6, for example 0.3 msec as illustrated in FIG. 6(g). When the 1.0 V circuit 47 is supplied with 1.0 V, a predetermined time t4, for example 5 msec, is required to rendered the 1.0 V circuit 47 operative. A 1.0 V signal from the regulator IC 42 is also supplied to the radio frequency amplifier 21 (FIG. 6(f)). By the time the 1.0 V circuit 47 is rendered operative, the PLL-IC 30 may have received the channel data. Therefore, the local oscillator 203 may begin the operations described in FIG. 4. In a predetermined time t5, for example 28 msec as illustrated in FIG. 6(e), the VCO 36 is locked so that the operation of the local oscillator 203 is stabilized.

The timing of the power supply to the RX-IC 48 will be described as follows. The controller 2072 supplies control signal BS2 to the regulator IC 42 at a predetermined time, for example 13 msec, after the supply of the control signal BS1 (FIG. 6(i)). Responsive to the control signal BS2, the regulator IC 42 begins converting the 1.95 V signal into a 1.65 V signal and outputs the regulated 1.65 V signal to the RX-IC 48 in a predetermined time t7, for example 0.3 msec as illustrated in FIG. 6(j). When the RX-IC 48 is supplied with 1.65 V, a predetermined time t8, for example 20 msec, is required to render it operative. The predetermined time t8 is preferably adjusted to the time period required for the limiter IC 206 to be rendered operative when power is supplied thereto. This is because the time period required for the limiter IC 206 to be rendered operative may be the longest among RX-IC 48 components (FIG. 6(k)). According to the time chart shown in FIG. 6, the receiver and the local oscillator 203 may begin the receiving operation at a desired time for the reception.

The operations shown in FIG. 6(b) to FIG. 6(k) may be repeated during the cyclic battery saving operation each time that the pager of FIG. 5 begins to receive paging signals. The time difference of the power supply timing (13 msec as exemplified above) between the local oscillator 203 and the RX-IC 48 contributes to the reduction of the power consumed in the pager. Additionally, it may be possible to further reduce the power consumed in the regulator IC 42 by delaying the converting operation from 1.95 V into 1.65 V compared with the converting operation from 1.4 V into 1.0 V.

As described above, the power supply timing between the local oscillator 203 and the RX-IC 48 is different. Consequently, the simultaneous supply of 1.0 V to the radio frequency amplifier 21 and the 1.0 V circuit 47 in the local oscillator may not be required. The power supplied to the radio frequency amplifier 21 may be delayed.

Figure 7:
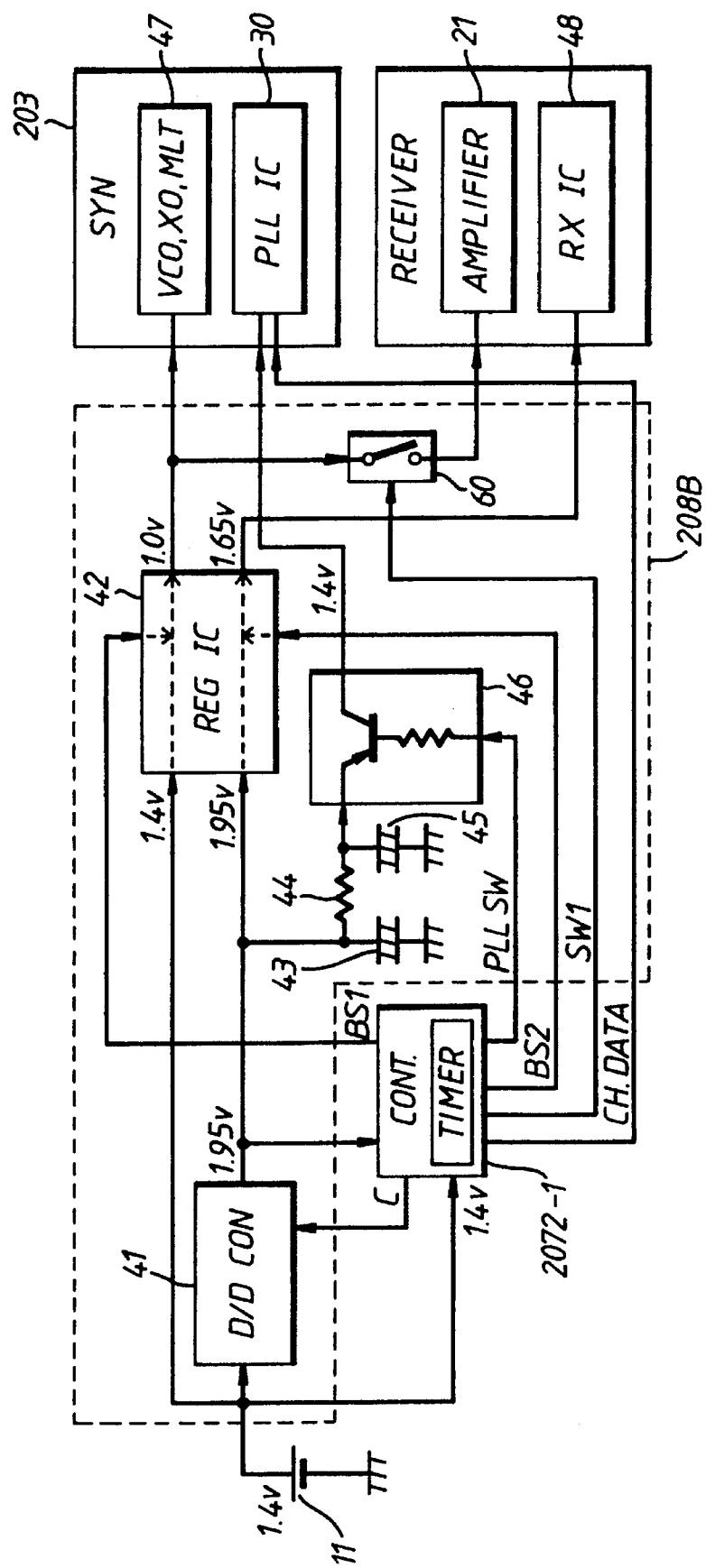
FIG. 7 is a block diagram showing a second alternative of power source circuit employed in the pager shown in FIG. 3.

FIG. 7 is a block diagram showing a power source circuit 208B according to a second embodiment of the power source circuit 208 shown in FIG. 3. The components common to FIG. 5 are given the same reference numbers. Such common components in FIG. 7 generally operate in a manner similar to that of the corresponding components in FIG. 5.

As shown in FIG. 7, a switch 60 is provided on a power supply path between the regulator IC 42 and the radio frequency amplifier 21. The switch 60 is controlled in response to control signal SW1 supplied from a controller 2072-1. The radio frequency amplifier 21 is supplied with 1.0 V only when switch 60 is closed. The switch 60 is opened at time F shown in FIG. 6(*f*). Switch 60 may then be closed when control signal BS2, illustrated in FIG. 6(*i*), is generated. According to the power source circuit 208B, the power consumed in the radio frequency amplifier 21 may be more effectively reduced.

Figure 8:
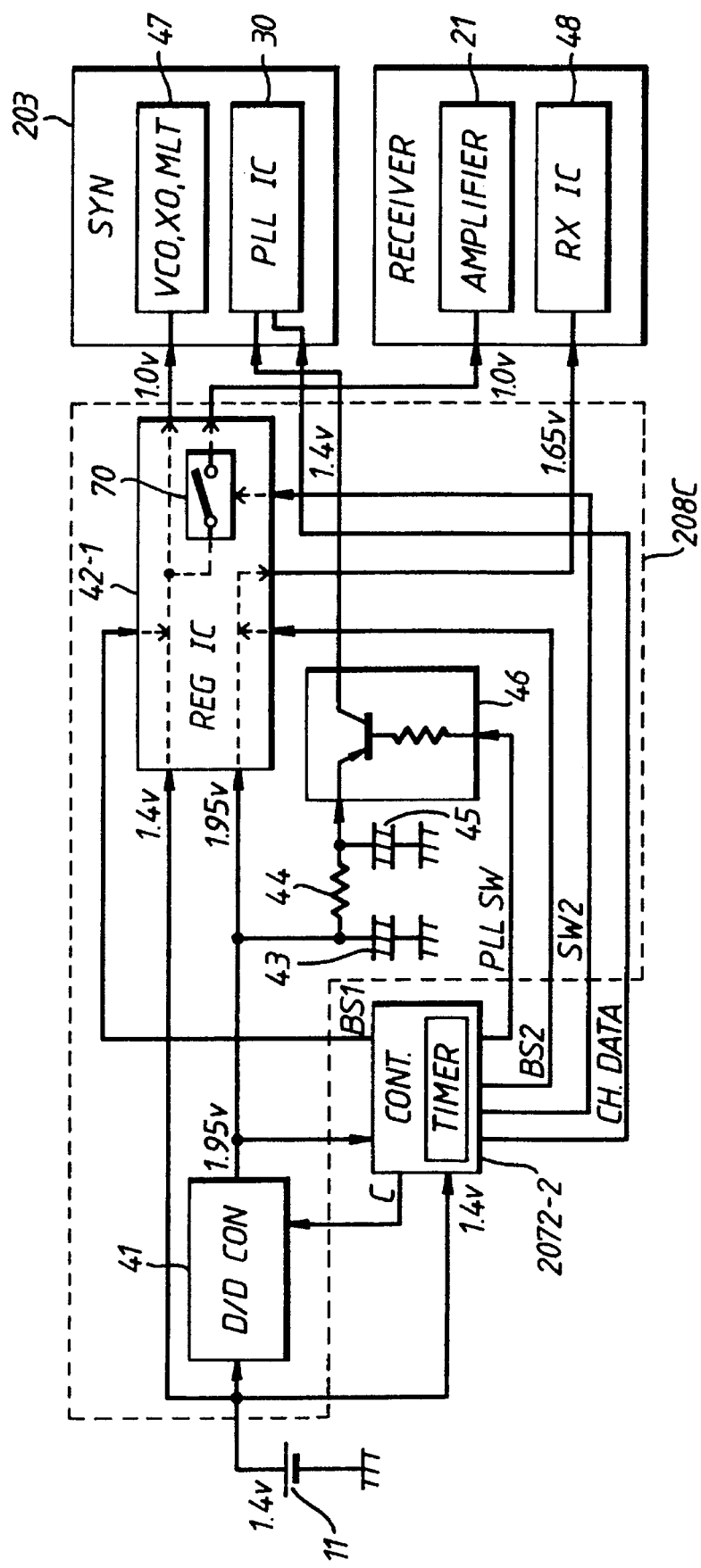
FIG. 8 is a block diagram showing a third alternative of power source circuit employed in the pager shown in FIG. 3.

FIG. 8 is a block diagram showing a power source circuit 208C according to a third embodiment of the power source circuit 208 shown in FIG. 3. The components in FIG. 8 which are common to FIG. 5 are given the same reference numbers. Such common components in FIG. 8 generally operate in a manner similar to that of the corresponding components in FIG. 5.

As shown in FIG. 8, a switch 70 is provided in the regulator IC 42-1 instead of outside the regulator IC 42 as switch 60 shown in FIG. 7. The switch 70 is controlled in response to control signal SW2 supplied from a controller 2072-2. Switching operations and switching timing of switch 70 may be the same as those of the switch 60 in FIG. 7. The power source circuit 208C may be used to reduce the overall size of the pager.

Figure 9:
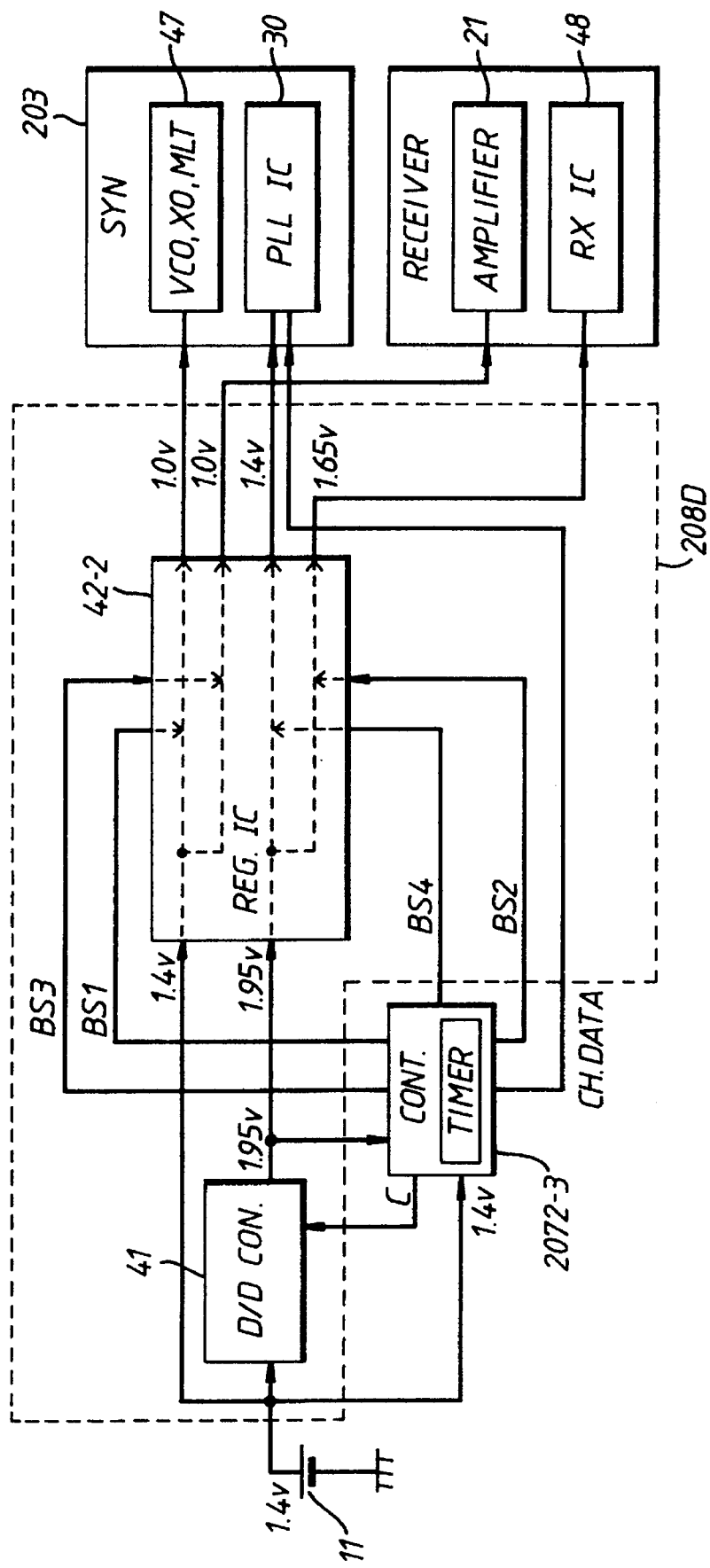
FIG. 9 is a block diagram showing a fourth alternative of power source circuit employed in the pager shown in FIG. 3.

Furthermore, a simplified power source circuit will be described with reference to FIG. 9. FIG. 9 is a block diagram showing a power source circuit 208*d* according to a fourth embodiment of the power source circuit 208 shown in FIG. 3. The components common to FIG. 5 are given the same reference numbers. Such common components in FIG. 9 generally operate in a manner similar to that of the corresponding components in FIG. 5.

As shown in FIG. 9, a regulator IC 42-2 supplies power to the 1.0 V circuit 47, the PLL-IC 30, the radio frequency amplifier 21 and the RX-IC 48. The circuitry comprising the capacitors 43, 45, the resistor 44, and the switching transistor 46 is not required to produce a 1.4 V signal. In the regulator IC 42-2, a 1.4 V signal path is divided into two paths before the 1.4 V signal is converted into a 1.0 V signal. The regulator IC 42-2 converts the 1.4 V signal on the first path into a 1.0 V signal for the 1.0 V circuit 47 in response to the control signal BS1. The regulator IC 42-2 also converts the 1.4 V signal on the second path into a 1.0 V signal for the radio frequency amplifier 21 in response to control signal BS3 supplied from a controller 2072-3. In addition, the regulator IC 42-2 includes a 1.95 V path which is divided into two paths before a 1.95 V signal is converted into a 1.4 V signal and a 1.65 V signal. The regulator IC 42-2 converts the 1.95 V signal on the first path into a 1.4 V signal in response to control signal BS4 supplied from the controller 2072-3. The regulator IC 42-2 also converts the 1.95 V signal on the second path into a 1.65 V signal in response to the control signal BS2.

The control signals BS1, BS2 may be supplied from the controller 2072-3 according to the same timing as shown in FIGS. 6(*h*), (*i*), respectively. The controller 2072-3 may supply the control signal BS3 at substantially the same time as the control signal SW2 described in FIG. 8 or at a predetermined time, for example 0.3 msec, after control signal SW2. The controller 2072-3 may supply the control signal BS4 at substantially the same time as the control signal PLL-SW shown in FIG. 6(*b*) or a predetermined time, for example 0.3 msec, after the control signal PLL-SW. The 0.3 msec duration is the duration of a clock, for example.

Although the power supply paths are divided inside the regulator IC 42-2 depicted in FIG. 9, the paths may be divided upstream of the regulator IC 42-2. In addition, switches to delay the power supply may be provided on the power supply path upstream or downstream of the regulator IC 42-2. Furthermore, a plurality of regulators may be provided instead of a switch and/or dividing the power supply path within a regulator. The number of regulators required may depend on the number of values of electric power to be supplied. Moreover, the efficiency of the battery saving operation may be further increased by supplying power to circuits in accordance with the time periods required for the circuits to be rendered operative.

Figure 10:
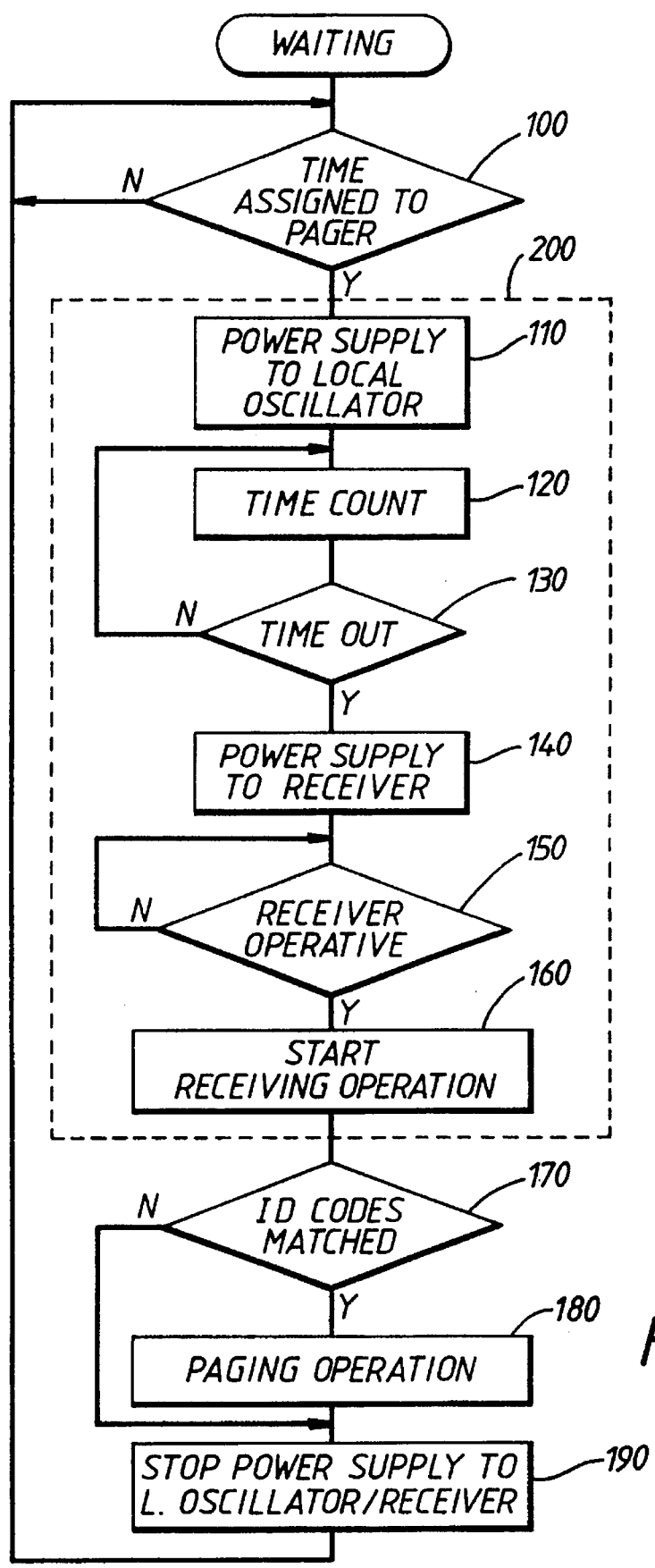
FIG. 10 is a flow chart for illustrating the operations of the apparatus according to embodiments of the present invention.

A general idea of the present invention will be described with reference to FIG. 10. FIG. 10 is a flow chart for explaining the operation of a pager of the present invention. The pager includes a controller having a timer. The controller monitors the incidence of the time assigned to a group to which the pager belongs in order to initiate the timing sequence of receiving operation (step 100).

When the assigned time occurs, to be precise, at a first predetermined time, for example 33 msec, before the assigned time a power source circuit begins to supply power to a local oscillator comprising a synthesizer (step 110). The first predetermined time may be basically a time period required for the local oscillator to be rendered operative when power is supplied thereto. Responsive to the power supply to the local oscillator, the timer begins to measure time by counting the number of clock pulses (for example, 0.3 msec/clock pulse) (step 120). The controller determines if a second predetermined time, for example 13 msec, has passed since the timer started (step 120). The second predetermined time may be approximately the difference between the time period required for the local oscillator to be rendered operative and a time period required for a receiver to be rendered operative when power is supplied thereto. When it is determined that the second predetermined time has passed, the power source circuit begins supplying power to the receiver (step 140). After power is supplied to the receiver, the controller determines whether or not both the local oscillator and the receiver are rendered operative (step 150). This determination may depend upon a determination of whether the first predetermined time has passed since the timer started. When it is determined that both the local oscillator and the receiver are rendered operative, the pager starts the receiving operation (step 160).

The receiver receives paging signals transmitted over a radio link. The controller compares an identification code included in the paging signals and an identification code stored in a ROM (step 170). If the identification codes substantially match, paging alert tones are output from a speaker (step 180). After the paging alert or when the identification codes do not substantially match at the step 170, the power supply to the local oscillator and the receiver are terminated (step 190) and the pager returns to the monitoring step 100 again.

A step 200 comprising the steps 110–160 forms a main operation of the present invention. The timer for the first and/or the second predetermined times may or may not be used to monitor the incidence of the receiving time.

Additionally, the present invention may be applicable to any system which utilizes circuits having different time periods required for them to be rendered operative when power is supplied thereto.

Still, although the pager is intermittently powered in response to a periodical control signal transmitted from a base station in the above-mentioned embodiments, any radio communication apparatus which is intermittently powered falls within the scope of the present invention.

The specific voltage or timing values described above are merely illustrative of the present invention and should not be considered to limit the invention. The invention may be practiced with other voltage values and/or time values.

Furthermore, although the embodiments of the present invention applied to a pager have been described above, the present invention may be applied to any other kind of radio communication apparatus having at least two circuits with different time periods required for the circuits to be rendered operative when power is supplied thereto, including but not limited to a portable telephone, a cordless telephone and a mobile unit of a cellular radio telephone system.

I claim:

1. A radio communication apparatus intermittently powered in synchronism with radio frequency signals transmitted from a base station, comprising:

a receiver for receiving radio frequency signals intermittently transmitted from a base station, said receiver comprising a local oscillator for generating oscillation signals having a first frequency and a signal processor for processing the received radio frequency signals and the oscillation signals to produce processed signals, wherein said local oscillator comprises a synthesizer including a phase locked loop and an oscillator circuit coupled to said phase locked loop;

power supply means for supplying power to said receiver;

controlling means for controlling said power supply means to supply power to said local oscillator at a first predetermined time before the radio frequency signals are received and to supply power to said signal processor at a second predetermined time after the first predetermined time, wherein said controlling means controls said power supply means to supply power to said phase locked loop at said first predetermined time and to further supply power to said oscillator circuit at a third predetermined time after said first predetermined time;

a demodulator coupled to said signal processor for demodulating the processed signals to produce demodulated signals;

a memory device for storing an identification code;

comparing means, coupled to said demodulator and said memory device, for comparing an identification code included in the demodulated signals and the identification code stored in said memory device; and an indicator responsive to said comparing means for indicating if the identification code in the demodulated signals matches the identification code stored in said memory device.

2. The radio communication apparatus of claim 1, wherein said oscillator circuit comprises a voltage controlled oscillator, a crystal oscillator, and a multiplier.

3. A radio communication apparatus intermittently powered in synchronism with radio frequency signals transmitted from a base station, comprising:

a receiver for receiving radio frequency signals intermittently transmitted from a base station, said receiver comprising a local oscillator for generating oscillation signals having a first frequency and a signal processor for processing the received radio frequency signals and the oscillation signals to produce processed signals, wherein said local oscillator comprises a phase locked loop and an oscillator circuit coupled to said phase locked loop;

power supply means for supplying power to said receiver, wherein said power supply means comprises a battery and a power source circuit for supplying power from said battery to said receiver;

controlling means for controlling said power supply means to supply power to said receiver, wherein said controlling means comprises:

(a) a switch connected between said power source circuit and said signal processor; and (b) a controller, coupled to said power source circuit and said switch, for controlling said power source circuit to supply power to said phase locked loop at a first predetermined time before the radio frequency signals are received, for closing said switch to supply power to said signal processor at a second predetermined time after the first predetermined time, and for controlling said power source circuit to supply power to said oscillator circuit at a third predetermined time after said first predetermined time;

a demodulator coupled to said signal processor for demodulating the processed signals to produce demodulated signals;

a memory device for storing an identification code;

comparing means, coupled to said demodulator and said memory device, for comparing an identification code included in the demodulated signals and the identification code stored in said memory device; and an indicator, responsive to said comparing means, for indicating if the identification code in the demodulated signals matches the identification code stored in said memory device.

4. The radio communication apparatus of claim 3, wherein said second predetermined time is approximately 33 msec. after the first predetermined time, and said third predetermined time is approximately 3 msec. after said first predetermined time.

5. The radio communication apparatus of claim 3, wherein said oscillator circuit comprises a voltage controlled oscillator, a crystal oscillator, and a multiplier.

6. The radio frequency apparatus of claim 3, wherein said receiver further comprises a radio frequency amplifier, coupled to said switch, for amplifying the radio frequency signals and for providing a amplified radio frequency signals to said signal processor, wherein said controller controls said switch to connect said power source circuit to said radio frequency amplifier at said second predetermined time.

7. The radio communication apparatus of claim 6, wherein said signal processor comprises:

a first bandpass filter coupled to said radio frequency amplifier for filtering the amplified radio frequency signals;

a first mixer, coupled to said first bandpass filter and said local oscillator, for mixing the filtered radio frequency signals from said first bandpass filter with the oscillation signals from said local oscillator to produce first intermediate frequency signals;

a second bandpass filter coupled to said first mixer for filtering the first intermediate frequency signals;

a further local oscillator for outputting oscillation signals having a second frequency; and a second mixer, coupled to said second bandpass filter and said further local oscillator, for mixing the filtered first intermediate frequency signals from said second bandpass filter and the oscillation signals having a second frequency to produce the processed signals.

8. The radio communication apparatus of claim 3, wherein said memory device comprises a read only memory.

9. The radio communication apparatus of claim 3, wherein said indicator comprises a LCD driver and an LCD coupled to said LCD driver.

10. The radio communication apparatus of claim 3, wherein said indicator comprises an amplifier and a speaker coupled to said amplifier.

11. A radio communication apparatus intermittently powered in synchronism with radio frequency signals transmitted from a base station, comprising:

a receiver for receiving radio frequency signals intermittently transmitted from a base station, said receiver comprising a radio frequency amplifier for amplifying the receiver radio frequency signal, a local oscillator for generating oscillation signals having a first frequency, and a signal processor for processing the amplified radio frequency signals and the oscillation signals to produce processed signals, said signal processor comprising:

(a) a first bandpass filter, coupled to said radio frequency amplifier, for filtering the amplified radio frequency signals;

(b) a first mixer, coupled to said first bandpass filter and to said local oscillator, for mixing the filtered signals and said oscillation signals having a first frequency to produce first baseband signals;

(c) a phase shifter coupled to said local oscillator for shifting the phase of said oscillation signals having a first frequency by a predetermined angle;

(d) a second mixer, coupled to said first bandpass filter and to said phase shifter, for mixing the filtered signals and the phase shifted oscillation signals to produce second baseband signals;

(e) a second bandpass filter, coupled to said first and second mixer, for filtering the first and second baseband signals; and (f) a limited coupled to said second bandpass filter for limiting the first and second filtered baseband signals to produce the processed signals;

a power supply for supplying power to said receiver, said power supply comprising a battery and a power source circuit coupled for supplying power from said battery to said receiver;

controlling means for controlling said power supply to supply power to said local oscillator at a first predetermined time before the radio frequency signals are received and to supply power to said signal processor at a second predetermined time after the first predetermined time;

a demodulator coupled to said signal processor for demodulating the processed signals;

a memory device for storing an identification code;

comparing means, coupled to said demodulator and said memory device, for comparing an identification code included in said demodulated signal and the identification code stored in said memory device; and an indicator responsive to said comparing means for indicating if the identification code in the demodulated signal matches the identification code stored in said memory device.

12. The radio communication apparatus of claim 11, wherein said demodulator comprises a detector for detecting the processed signals.

13. The radio communication apparatus of claim 11, wherein said second bandpass filter a bandpass filter integrated circuit.

14. The radio communication apparatus of claim 11, wherein said limiter comprises a limiter integrated circuit.

15. The radio communication apparatus of claim 11, wherein said limiter comprises:

a first amplitude limiting amplifier for limiting the amplitude of the first filtered baseband signals; and a second amplitude limiting amplifier for limiting the amplitude of the second filtered baseband signals.

16. The radio communication apparatus of claim 11, wherein said local oscillator comprises:

a reference oscillator for outputting a reference oscillation signal;

a phase locked loop comprising a reference divider responsive to said controlling means for dividing the frequency of the reference oscillation signal by a first dividing rate to produce a divided reference signal, a comparison divider responsive to said controlling means for dividing an input signal by a second dividing rate to produce a divided comparison signal, and a phase comparator coupled to said reference divider and said comparison divider for outputting an information signal when the divided comparison signal does not substantially equal the divided reference signal;

a low pass filter coupled to said phase comparator for filtering the information signal;

a voltage controlled oscillator, coupled to said low pass filter, for outputting the oscillation signals to said comparison divider as the input signal, the frequency of the oscillation signals being controlled on the basis of the filtered information signal;

a multiplier, coupled to said voltage controlled oscillator, for multiplying the oscillation signals and supplying the multiply signals to said first mixer and to said phase shifter, wherein said controlling means further controls the dividing rates of said reference comparator and said comparison divider.

17. The radio communication apparatus of claim 16, wherein said phase locked loop comprises a phase locked loop integrated circuit.

18. A radio communication apparatus intermittently powered in synchronism with radio frequency Signals transmitted from a base station, comprising;

a receiver for receiving radio frequency signals intermittently transmitted from a base station, said receiver comprising:

(a) a radio frequency amplifier for amplifying the received radio frequency signals;

(b) a local oscillator having a phase locked loop integrated circuit and an oscillator circuit coupled to said phase locked loop integrated circuit for outputting oscillation signals having a first frequency; and (c) a signal processor for processing the amplified radio frequency signals and the oscillation signals having the first frequency to produce processed signals, said signal processor including a receiver integrated circuit coupled to said oscillator circuit;

a power supply for supplying power to said receiver, said power supply comprising a battery and a power source circuit coupled for supplying power from said battery to said receiver;

controlling means for controlling said power supply to supply power to said local oscillator at a first predetermined time before the radio frequency signals are received and to supply power to said signal processor at a second predetermined time after the first predetermined time;

a demodulator coupled to said signal processor for demodulating the processed signals;

a memory device for storing an identification code;

comparing means, coupled to said demodulator and said memory device, for comparing an identification code included in said demodulated signal and the identification code stored in said memory device; and an indicator responsive to said comparing means for indicating if the identification code in the baseband signal matches the identification code stored in said memory device.

19. The radio communication apparatus of claim 18, wherein said oscillator circuit comprises:

a voltage controlled oscillator coupled to said phase locked loop integrated circuit;

a reference oscillator couple to said phase locked loop integrated circuit; and a multiplier coupled to said voltage controlled oscillator and to said receiver integrated circuit.

20. The radio communication apparatus of claim 18, wherein said signal processor further comprises a phase shifter for phase shifting the oscillation signals having a first frequency by a predetermined angle and said receiver integrated circuit comprises:

a first mixer, coupled to said radio frequency amplifier and to said oscillator circuit, for mixing said amplified signals and said oscillation signals to produce first mixed signals;

a second mixer, coupled to said radio frequency amplifier and to said phase shifter, for mixing said amplified signals and said phase shifted oscillation signals to produce second mixed signals;

a filter integrated circuit for filtering said first and second mixed signals and outputting filtered signals; and a limiter integrated circuit for limiting said filtered signals and outputting limited signals to said demodulator as processed signals.

21. The radio communication apparatus of claim 18, wherein said battery outputs a first predetermined voltage and said power source circuit comprises:

a DC/DC converter, responsive to said controlling means, for converting the first predetermined voltage supplied from said battery to a second predetermined voltage;

a regulator, responsive to said controlling means, for converting and regulating the first predetermined voltage supplied from said battery to a third predetermined voltage and for converting and regulating the second predetermined voltage supplied from said DC/DC converter to a fourth predetermined voltage, the third predetermined voltage being supplied to power said oscillator circuit and said radio frequency amplifier, and said fourth predetermined voltage being supplied to power said receiver integrated circuit;

voltage converting means for converting the second predetermined voltage supplied from said DC/DC converter to a fifth predetermined voltage; and a switch, responsive to said controlling means, for selectively supplying said fifth predetermined voltage from said voltage converting means to power said phase locked loop integrated circuit.

22. The radio communication apparatus of claim 21, wherein said controlling means comprises:

enabling means for enabling said DC/DC converter at a third predetermined time before said first predetermined time;

means for controlling said switch to supply said fifth predetermined voltage to said phase locked loop integrated circuit at said first predetermined time; and means for controlling said regulator to supply the third voltage to said oscillator circuit and to said radio frequency amplifier at said first predetermined time and to supply the fourth predetermined voltage to said receiver integrated circuit at said second predetermined time.

23. The radio communication apparatus of claim 21, wherein said power source circuit further comprises a further switch, responsive to said controlling means, located between said regulator and said radio frequency amplifier for selectively supplying the third predetermined voltage to said radio frequency amplifier.

24. The radio communication apparatus of claim 23, wherein said controlling means comprises:

enabling means for enabling said DC/DC converter at a third predetermined time before said first predetermined time;

means for controlling said switch to supply said fifth predetermined voltage to said phase locked loop integrated circuit at said first predetermined time;

means for controlling said regulator to supply the third predetermined voltage to said oscillator circuit at said first predetermined time and to supply the fourth predetermined voltage to said receiver integrated circuit at said second predetermined time; and means for controlling said further switch to supply said third predetermined voltage from said regulator to said radio frequency amplifier at a fourth predetermined time after said first predetermined time.

25. The radio communication apparatus of claim 21, wherein said regulator comprises a regulator switch, responsive to said controlling means, for selectively supplying the third predetermined voltage to said radio frequency amplifier.

26. The radio communication apparatus of claim 25, wherein said controlling means comprises:

enabling means for enabling: said DC/DC converter at a third predetermined time before said first predetermined time;

means for controlling said switch to supply said fifth predetermined voltage to said phase locked loop integrated circuit at said first predetermined time;

means for controlling said regulator to supply the third predetermined voltage to said oscillator circuit and to supply the fourth predetermined voltage to said receiver integrated circuit; and means for controlling said regulator switch to supply said third predetermined voltage to said radio frequency amplifier.

27. The radio communication apparatus of claim 18, wherein said battery outputs a first predetermined voltage and said power source circuit comprises:

a DC/DC converter, responsive to said controlling means, for converting the first predetermined voltage supplied from said battery to a second predetermined voltage;

a regulator, responsive to said controlling means, for converting and regulating the first predetermined voltage supplied from said battery and the second predetermined voltage supplied from said DC/DC converter to a third predetermined voltage, a fourth predetermined voltage, and a fifth predetermined voltage, the third predetermined voltage being supplied to power said oscillator circuit and said radio frequency amplifier, the fourth predetermined voltage being supplied to power said receiver integrated circuit, and the fifth predetermined voltage being supplied to power said phase locked loop integrated circuit.

28. The radio communication apparatus of claim 27, wherein said controlling means comprises:

enabling means for enabling said DC/DC converter at a third predetermined time before said first predetermined time;

means for controlling said regulator to supply said fifth predetermined voltage to said phase locked loop integrated circuit at said first predetermined time;

means for controlling said regulator to supply the third predetermined voltage to said oscillator circuit at a fourth predetermined time after said first predetermined time;

means for controlling said regulator to supply the fourth predetermined voltage to said receiver integrated circuit at said second predetermined time; and means for controlling said regulator to supply said third predetermined voltage to said radio frequency amplifier at a fifth predetermined time after said first predetermined time.

29. A radio communication apparatus intermittently powered in synchronism with radio frequency signals transmitted from a base station, comprising:

a synthesizer circuit for generating oscillation signals;

a receiver circuit, coupled to said synthesizer circuit, for receiving radio frequency signals transmitted from a base station and for converting the received radio frequency signals into baseband signals using the oscillation signals;

a memory device for storing an identification code;

a controller for comparing an identification code in the baseband signals to the identification code stored in said memory device and for generating power control signals;

an indicator, coupled to said controller, for providing an indication to a user if the identification code in the baseband signals matches the identification code stored in said memory device;

a battery; and power source circuitry, responsive to the power control signals, for supplying power from said battery to a first portion of said synthesizer circuit at a first predetermined time, to a second portion of said synthesizer circuit at a second predetermined time after the first predetermined time, and to said receiver circuit at a third predetermined time after the second predetermined time.

30. The radio communication apparatus according to claim 29, wherein the first portion of said synthesizer circuit comprises a phase locked loop.

31. The radio communication apparatus according to claim 30, wherein the second portion of said synthesizer circuit comprises an oscillator circuit.

32. The radio communication apparatus according to claim 31, wherein said oscillator circuit comprises a voltage controlled oscillator, a crystal oscillator, and a multiplier.

33. The radio communication apparatus according to claim 29, wherein said power source circuitry comprises:

a power source circuit having a first output terminal coupled to the first portion of said synthesizer circuit and a second output terminal coupled to the second portion of said synthesizer circuit, wherein said power source circuit outputs power from said first terminal at the first predetermined time in response to a first power control signal from said controller and outputs power from said second terminal at the second predetermined time in response to a second power control signal from said controller; and a switch, responsive to a third power control signal from said controller, for coupling the second terminal of said power source circuit to said receiver circuit at the third predetermined time.

34. The radio communication apparatus according to claim 33, wherein the first portion of said synthesizer circuit comprises a phase locked loop and the second portion of said synthesizer circuit comprises a voltage controlled oscillator, a crystal oscillator, and a multiplier.

35. A radio communication apparatus intermittently powered in synchronism with radio frequency signals transmitted from a base station, comprising:

a synthesizer circuit for generating oscillation signals;

a receiver circuit, coupled to said synthesizer circuit, for receiving radio frequency signals transmitted from a base station and for converting the received radio frequency signals into baseband signals using the oscillation signals;

a memory device for storing an identification code;

a controller for comparing an identification code in the baseband signals to the identification code stored in said memory device and for generating a plurality of power control signals;

an indicator, coupled to said controller, for providing an indication to a user if the identification code in the baseband signals matches the identification code stored in said memory device;

a battery; and a power source circuit for supplying power from said battery to said synthesizer circuit at a first predetermined time and to said receiver circuit at a second predetermined time, wherein said power source circuit includes (1) a DC/DC converter, coupled to said battery, for converting a battery voltage to a converter output voltage responsive to a first power control signal from said controller, and (2) a regulator integrated circuit for converting the battery voltage to a first regulator voltage responsive to a second power control signal from said controller and for converting the converter output voltage to a second regulator voltage responsive to a third power control signal from said controller, the first regulator voltage being supplied to a portion of said synthesizer circuit at the first predetermined time and the second regulator voltage being supplied to said receiver circuit at the second predetermined time.

36. The radio communication apparatus according to claim 35, wherein said controller receives the battery voltage and the converter output voltage.

37. The radio communication apparatus according to claim 35, wherein said synthesizer circuit comprises a first circuit portion including a phase locked loop and a second circuit portion, and wherein said first regulator voltage is supplied to said second circuit portion at said first predetermined time thereby enabling said second circuit portion to become operative before said receiver circuit receives the radio frequency signals.

38. The radio communication apparatus according to claim 37, wherein said power source circuit further comprises a secondary voltage converter for converting the converter output voltage to a secondary voltage and a switching circuit for coupling the secondary voltage to said phase locked loop at the first predetermined time in response to a fourth power control signal from said controller, thereby enabling said phase locked loop to lock before said receiver receives the radio frequency signals.

39. The radio communication apparatus according to claim 38, wherein said switching circuit comprises a bipolar switching transistor having a base coupled to receive the fourth power control signal, an emitter coupled to said secondary voltage converter, and a collector coupled to said phase locked loop.

40. The radio communication apparatus according to claim 39, wherein said secondary voltage converter comprises:
- a first capacitor having a first terminal receiving said converter voltage and a second terminal coupled to ground;
- a resistor having a first terminal coupled to the first terminal of said first capacitor and a second terminal coupled to the emitter of said switching transistor; and
- a second capacitor having a first terminal coupled to the second terminal of said resistor and a second terminal coupled to ground.

41. The radio communication apparatus according to claim 38, wherein said receiver circuit comprises a radio frequency amplifier and a receiver integrated circuit.

42. The radio communication apparatus according to claim 41, wherein the first regulator voltage is supplied to said radio frequency amplifier and said second regulator voltage is supplied to said receiver integrated circuit.

43. The radio communication apparatus according to claim 42, wherein said power source circuit further comprises a further switching circuit, responsive to a fifth power control signal from said controller, for coupling the first regulator voltage to said radio frequency amplifier at a third predetermined time after said first predetermined time.

44. The radio communication apparatus according to claim 42, wherein said regulator integrated circuit further comprises a switching circuit, responsive to a fifth power control signal from said controller, for coupling the first regulator voltage to said radio frequency amplifier at a third predetermined time after the first predetermined time.

45. The radio communication apparatus according to claim 37, wherein said receiver circuit comprises a radio frequency amplifier and a receiver integrated circuit, the second regulator voltage being supplied to said receiver integrated circuit at the second predetermined time.

46. The radio communication apparatus according to claim 45, wherein said regulator .integrated circuit converts the battery voltage to a third regulator voltage responsive to a third power control signal from said controller and converts the converter voltage to a fourth regulator voltage responsive to a fourth power control signal from said controller, the third regulator voltage being supplied to said radio frequency amplifier at a third predetermined time and the fourth regulator voltage being supplied to said phase locked loop at the first predetermined time.

* * * * *